(12) United States Patent
Diehl et al.

(10) Patent No.: US 9,137,493 B2
(45) Date of Patent: Sep. 15, 2015

(54) METHOD AND DEVICE FOR EXCERPT LICENSING

(75) Inventors: Eric Diehl, Liffre (FR); Yves Maetz, Melesse (FR); Mohamed Karroumi, Rennes (FR); Stéphane Onno, Saint Gregoire (FR)

(73) Assignee: THOMSON LICENSING, Issy les Moulineaux (FR)

( * ) Notice: Subject to any disclaimer, the term of this patent is extended or adjusted under 35 U.S.C. 154(b) by 370 days.

(21) Appl. No.: 13/370,865

(22) Filed: Feb. 10, 2012

(65) Prior Publication Data

US 2012/0210439 A1     Aug. 16, 2012

(30) Foreign Application Priority Data

Feb. 10, 2011    (EP) ..................................... 11305133

(51) Int. Cl.
| | | |
|---|---|---|
| *G06F 7/04* | (2006.01) | |
| *G06F 17/30* | (2006.01) | |
| *H04N 7/16* | (2011.01) | |
| *H04L 9/00* | (2006.01) | |

(Continued)

(52) U.S. Cl.
CPC ............. *H04N 7/1675* (2013.01); *G06F 21/10* (2013.01); *H04N 21/2347* (2013.01); *H04N 21/8355* (2013.01); *H04N 21/8456* (2013.01); *H04N 21/8549* (2013.01)

(58) Field of Classification Search
CPC .......... H04N 21/8549; H04N 21/8456; H04N 21/2541; H04N 21/4627; G06F 21/10; G11B 20/00731; G11B 20/00847; G11B 20/00978; G11B 20/00985; G11B 20/00086

USPC .............. 726/26–33; 380/200, 210, 255, 259, 380/283, 44, 46, 277

See application file for complete search history.

(56) References Cited

U.S. PATENT DOCUMENTS

| | | |
|---|---|---|
| 5,442,701 A | 8/1995 | Guillou et al. |
| 5,691,915 A | 11/1997 | Funahashi et al. |

(Continued)

FOREIGN PATENT DOCUMENTS

| | | |
|---|---|---|
| EP | 2207340 A1 | 7/2010 |
| WO | WO02062054 | 8/2002 |
| WO | WO2006023334 | 3/2006 |

OTHER PUBLICATIONS

Lotspiech et al., "Anonymous Trust: Digital Rights Management Using Broadcat Encryption", Proceedings of the IEEE, vol. 92, No. 6, New York, NY, Jun. 1, 2004.

(Continued)

*Primary Examiner* — Shewaye Gelagay
*Assistant Examiner* — Trong Nguyen
(74) *Attorney, Agent, or Firm* — Tutunjian & Bitetto, P.C.

(57) ABSTRACT

There are times when a first user may wish to distribute an excerpt of a protected digital content to a second user, for example for criticism. The protected digital content is divided into a plurality of parts, each part being encrypted using a control word specific for the part, wherein each control word can be generated from a master control word for the protected digital content. A device belonging to the first user selects the parts of the excerpt; generates the control words for the selected parts from the master control word; generates a license for the selected parts, the license comprising the control words for the selected parts; and transmits the selected parts and the license to the receiver of the second user. Also provided is the device of the first user.

10 Claims, 2 Drawing Sheets

(51) Int. Cl.
   *H04L 9/08* (2006.01)
   *H04N 7/167* (2011.01)
   *H04N 21/8549* (2011.01)
   *G06F 21/10* (2013.01)
   *H04N 21/2347* (2011.01)
   *H04N 21/8355* (2011.01)
   *H04N 21/845* (2011.01)

(56) References Cited

U.S. PATENT DOCUMENTS

| | | | |
|---|---|---|---|
| 2002/0004785 | A1 | 1/2002 | Schull |
| 2003/0086695 | A1 | 5/2003 | Okamoto et al. |
| 2004/0128324 | A1* | 7/2004 | Sheynman et al. ............ 707/200 |
| 2004/0196972 | A1* | 10/2004 | Zhu et al. ......................... 380/45 |
| 2006/0059090 | A1* | 3/2006 | Lahtinen et al. ................ 705/50 |
| 2006/0287956 | A1* | 12/2006 | Higashi et al. ................. 705/51 |
| 2007/0283420 | A1 | 12/2007 | Rantalahti |
| 2007/0300078 | A1* | 12/2007 | Ochi et al. ..................... 713/189 |
| 2008/0059992 | A1* | 3/2008 | Amidon et al. ................. 725/25 |
| 2008/0270308 | A1 | 10/2008 | Peterka et al. |
| 2008/0270311 | A1* | 10/2008 | Peterka et al. ................. 705/59 |
| 2009/0245514 | A1 | 10/2009 | Singer |

OTHER PUBLICATIONS

European Search Report dated Jun. 7, 2011.
U.S. Copyright Office Summary, "Digital Millennium Copyright Act of 1998", Pub. L. No. 105-304, 112 Stat. 2860, Oct. 28, 1998, pp. 1-18.
Gillespie, T., "Wired Shut—Copyright and the Shape of Digital Culture", MIT Press, Cambridge, 2007, pp. 1-5. English Overview.

* cited by examiner

METHOD AND DEVICE FOR EXCERPT LICENSING

This application claims the benefit, under 35 U.S.C. §119 of EP Patent Application 11305133.8 filed 10 Feb. 2011.

TECHNICAL FIELD

The present invention relates generally to Digital Rights Management (DRM), and more particularly to a DRM solution that allows an end user to distribute an excerpt of a content item.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

DRM solution are often considered as user unfriendly, a common complaint being that DRMs prohibit fair use as defined by the Digital Millennium Copyright Act, 1998 [see http://www.copyright.gov/legislation/dmca.pdf]. Among the many things considered as part of fair use is the right of an end user to cite or use an excerpt of a work, i.e. content item, for criticism, scholarship and so on. This is however not possible with the prior art DRM solutions.

It will therefore be appreciated that there is a need for a DRM solution that can:
  Protect a content item against illegal or unauthorized use.
  Allow an end user to extract a portion of the content item and redistribute the portion to other end users who may then access the portion, regardless of whether or not these end users have access rights to the entire content item.
  Make it difficult for colluding end users to distribute an entire work freely by concatenating a set of excerpts of the work.

The present invention provides a part of such a solution: to wit, it enables an end user to extract an excerpt of the content item and send the excerpt to another end user that may then access the excerpt.

SUMMARY OF INVENTION

In a first aspect, the invention is directed to a method for providing an excerpt of a protected digital content to a receiver. The protected digital content has been divided into a plurality of parts, each part has been encrypted using a control word specific for the part, and each control word has been generated from a master control word for the protected digital content. A device receives the protected digital content and a global license for the protected digital content, the global license comprising the master control word; selects the parts of the protected digital content to be included in the excerpt; generates the control words for the selected parts from the master control word; generates an excerpt license for the selected parts, the excerpt license comprising the control words for the selected parts; and transmits the selected parts of the protected digital content and the excerpt license to the receiver.

In a first preferred embodiment, each generated control word is associated with an index of the part corresponding to the control word and each index is included in the license during the generating step. It is advantageous that the control words are generated using a pseudo-random number generator taking as input the master control word and the indices.

In a second preferred embodiment, the protected digital content is associated with authorization information that limits its excerpt provision; and device verifies the authorization information and generates the license only if the verification indicates that excerpt provision is allowed.

In a second aspect, the invention is directed to a device for providing an excerpt of a protected digital content to a receiver, the protected digital content being divided into a plurality of parts, each part being encrypted using a control word specific for the part, each control word being generated from a master control word for the protected digital content. The device comprises at least one processor adapted to: receive the protected digital content and a global license for the protected digital content, the global license comprising the master control word; select the parts of the protected digital content to be included in the excerpt; generate the control words for the selected parts from the master control word; generate an excerpt license for the selected parts, the excerpt license comprising the control words for the selected parts; and transmit the selected parts of the protected digital content and the excerpt license to the receiver.

In a first preferred embodiment, the processor is further adapted to associate each generated control word with an index of the part corresponding to the control word and to include each index in the license during the generation of the license. It is advantageous that the device further comprises a pseudo-random number generator adapted to take the master control word and the indices as input to generate the control words.

In a second preferred embodiment, the protected digital content is associated with authorization information that limits its excerpt provision; and wherein the processor is further adapted to verify the authorization information and to generate the license only if the verification indicates that excerpt provision is allowed.

In a third aspect, the invention is directed to a computer program product storing instructions, which, when executed by a processor, causes the processor to perform the method of any embodiment of the first aspect.

BRIEF DESCRIPTION OF DRAWINGS

Preferred features of the present invention will now be described, by way of non-limiting example, with reference to the accompanying drawings, in which.

DESCRIPTION OF EMBODIMENTS

A main idea of the present invention is to provide dual protection modes for an item of content. In order to achieve this, the content is partitioned into a set of sequential sequences herein called "units". Each unit has a fixed duration, but the duration may vary between units.

Figure 1:
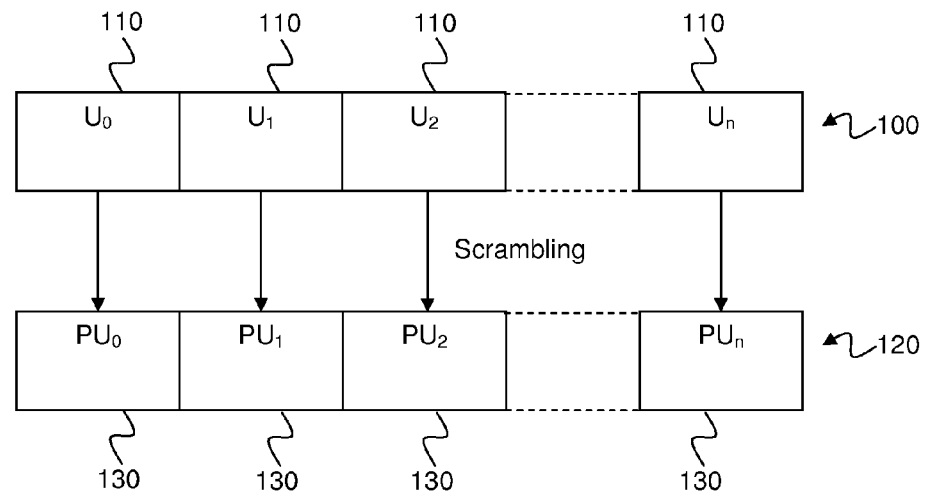
FIG. 1 illustrates content divided into a plurality of units according to a preferred embodiment of the present invention.

FIG. 1 illustrates a content 100 divided into a plurality of units 110. Each unit ($U_j$) 110 is identified by a unit index (j), which advantageously, but not necessarily, is sequential. The content 100 thus comprises the set of units $\{U_0, U_1, U_2, \ldots, U_n\}$. It is advantageous, but not necessary, that the units are equally long (in playback time) or big (in size), a notable possible exception being the last unit that may be shorter. Exemplary lengths are 1 second and 10 seconds. The skilled person will appreciate that the shorter the length, the more precise a selection of a part of the content may be, while this comes at the cost of having to generate more control words (which will be seen hereinafter).

Figure 2:
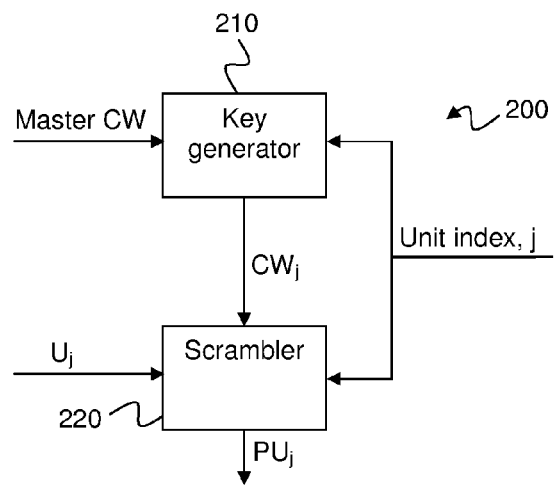
FIG. 2 illustrates a scrambling device according to a preferred embodiment of the present invention.

Scrambling (also called encryption) of the content 100 is described with further reference to FIG. 2, which illustrates a scrambling device 200 that comprises a key generator 210 and a scrambler 220. The scrambling device 200 may be implemented as one or more processors.

To scramble the content 100, its units 110 are scrambled separately. The key generator 210 obtains a master CW (Control Word; also called key) for the content 100 and generates a unit CW for each unit 110 to scramble. The unit indices that the key generator 210 works from may be generated internally (if the indices are sequential) up to a final unit index obtained for example from the content 100; the unit indices may also be provided by a control circuit (not shown) or by the scrambler after inspection of the unit to scramble. The generated unit control word $CW_j$ is delivered to the scrambler 220, possibly along with the corresponding unit index, but the scrambler 220 may also receive the unit index from the control circuit. A further possibility is for the key generator and the scrambler to be synchronised, in which case a unit CW could be delivered when needed by the scrambler. The scrambler 220 receives a unit $U_j$ and uses the unit CW to scramble the unit $U_j$ and outputs a protected unit $PU_j$.

This is also illustrated in FIG. 1, wherein the units $U_j$ of the content 100 in the upper row are scrambled as protected units $PU_j$ 130 of a protected content 120 in the lower row.

In mathematical notation, the key generator 210 generates a sequence of pseudo-random numbers $\{CW_0, CW_1, CW_2, \ldots CW_n\}$, where $CW_j = PRNG(\text{master } CW, j)$. Any suitable prior art sequenced Pseudo-random number generator (PRNG) may be used, provided that the length of the output corresponds to the key length of the scrambling algorithm (128 bits for the preferred Advanced Encryption Standard AES used by the scrambler.

It should be noted that the PRNG of the key generator 210 preferably has the following characteristics that are well known in the field of cryptography:

Given a unit index and the corresponding unit CW, it is computationally unfeasible to calculate the master CW.

Given a unit index and the corresponding unit CW, it is computationally unfeasible to calculate the unit CW of the preceding or the succeeding unit.

Similarly, the scrambler 220 takes as input a unit $U_j$ and a corresponding unit control word CW, and outputs a protected unit $PU_j$; $PU_j = E\{CW_j, U_j\}$, wherein E denotes an encryption (scrambling) algorithm, which may be practically any suitable prior art encryption algorithm such as the preferred AES-128-ENC (i.e. encryption).

An interesting feature of the present invention is the aforementioned dual protection modes for the content. The content may be delivered to a (user) device in two different ways.

First, the content (or part of it) may be delivered to the device with a global license that comprises the master CW. The global license advantageously comprises a unique identifier for the content, the master CW, and an integrity checksum. In a preferred embodiment, each device has at least one (advantageously unique) 1024-bit RSA key pair. To protect a global license for a device, the sender encrypts the global license using the public key of the device. Upon reception of the encrypted global license, the device decrypts it using the corresponding private key and verifies the validity of the integrity checksum. If the checksum is correct, then the master CW may be used to descramble the protected content. In a variant embodiment, the device may also forward the global license to a further device, preferably after encryption of the license with the public key of the further device.

It is also advantageous that the global license comprises information that restricts excerpt sharing. To this end, the global license further comprises an Excerpt Sharing field that stores at least the following four parameters:

Authorization parameter: indicates whether excerpt sharing is permitted or not; possibly further provides a time period during which it is permitted;

Units number/Excerpt length: indicates the maximum number of units or the maximum length of an excerpt that may be exported as an excerpt;

Share count: indicates the maximum number of users to which an excerpt can be distributed; also provides the identities of the device to which an excerpt has been distributed; and Excerpt count: limits the number of excerpts that may be shared for a certain content.

The Excerpt Count value is decremented when an excerpt license is generated. When it reaches zero, excerpt license generation is not authorized anymore and the Authorization parameter may be updated. Further, the Share count is updated every time the content is distributed to a new user, and the user's identifier is added as well.

Updating licenses is well known in the art—e.g. licenses that allow N viewings of a film—and will therefore not be further described herein.

Second, a part of the content, i.e. a subset of the set of units, may be delivered along with an excerpt license that comprises information about the unit indices and the corresponding unit CWs; this may be expressed as the unit index of the first unit of the subset and of the last unit of the subset (or, alternatively, the number of units in the subset) or as a set of couples that each comprises the unit index and the corresponding unit CW, $\{(r, CW_r), (r+1, CW_{r+1}), \ldots, (r+m, CW_{r+m})\}$. It should be noted that in the latter case, it is also possible to deliver the entire content with the excerpt license, even though this is less advantageous for bandwidth reasons. The excerpt license is preferably encrypted using a public key of the receiving device.

Figure 3:
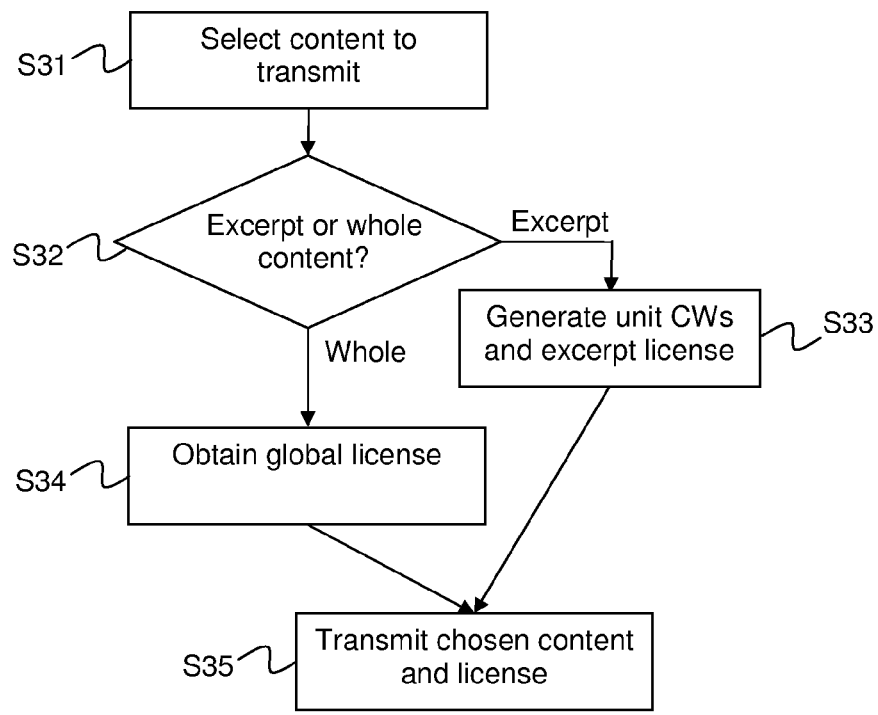
FIG. 3 illustrates a content transmission method according to a preferred embodiment of the present invention.

Such a content transmission method is illustrated in FIG. 3. The method is advantageously performed at an end user device that has received the content from a content owner or the like. First, the content to transmit is selected in step S31; the device advantageously receives instructions from a user and selects the content accordingly but the selection can also be automated. This can be the entire content or an excerpt thereof. In step S32, it is determined whether the entire content or an excerpt was chosen. If the entire content was chosen, then the global license is obtained, step S34, either by generating the global license or by retrieving it from where it is stored. It should be noticed that the global license in certain cases does not allow the user device to export the entire content and, in particular, the global license. If an excerpt was chosen, in step S33 the unit CWs and the excerpt license are generated, as described hereinbefore. In step S35, the chosen license and content are transmitted, advantageously to a further end user device.

A user device (i.e. a receiver) that receives the content and a global license is able to descramble the whole content or, if desired, just part of it. On the other hand, the characteristics of the PRNG mentioned hereinbefore ensure that a receiver that receives an excerpt license is only able to descramble the units for which the excerpt license comprises CWs. It is thus possible to distribute an excerpt of a content is a secure way; in particular, the excerpt license does not allow a user to access other parts of the content.

Figure 4:
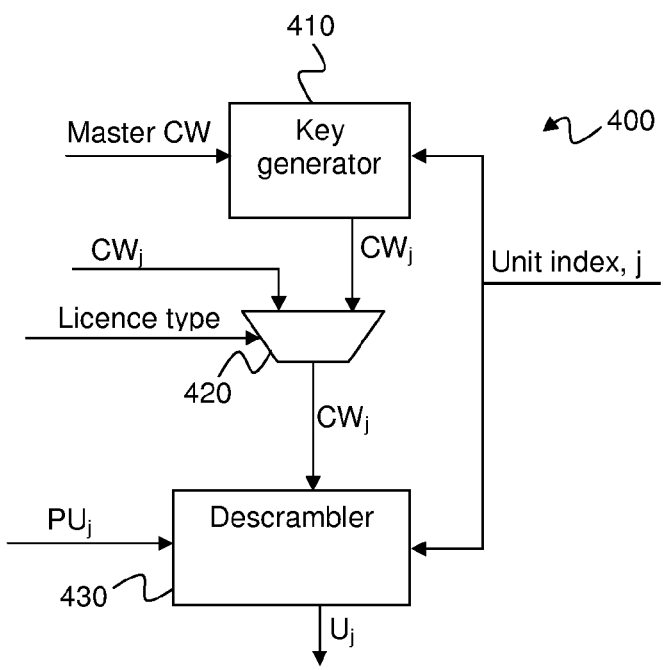
FIG. 4 illustrates descrambling of received content according to a preferred embodiment of the present invention.

FIG. 4 illustrates descrambling of received content by a receiver device. It should be noted that an end user device preferably implements both the content transmission method of FIG. 3 and the content descrambling of FIG. 4. The descrambling device 400, which has received a content and a license through an interface (not shown), comprises a key generator 410 that takes a master CW extracted from a global license and possibly one or more unit indices to generate one or more unit control words $CW_j$. The key generator 410 implements the same algorithm as the key generator 210 of the scrambling device 200; this is necessary for successful decryption. The descrambling device 400 further comprises a selection unit 420 that takes the type of license—global or excerpt—as input in order to select between CWs generated by the key generator 410 and control words extracted from an excerpt license. It will be appreciated that the selected unit CW for a unit is the same regardless of whether it comes from the key generator 410 or the excerpt license; it's just the way to obtain the unit CW that differs. The selection unit 420 is illustrated as a switch, but it can be implemented in a number of ways known in the art: what matters is that it obtains the CWs from the global license or the excerpt license. The selected CW (which is a unit CW) is transferred to a descrambler 430 that uses the unit control word CW, to descramble the corresponding protected unit $PU_j$. The descrambler 430 implements a descrambling algorithm that corresponds to the scrambling algorithm of the scrambler 220 of the scrambling device 200, i.e. preferably AES-128-DEC (i.e. decryption). The descrambling device is preferably implemented using at least one processor, memory and other necessary features such as interfaces and content rendering means.

The invention also relates to a computer program product, such as a DVD or a CD-ROM, that stores instructions, which, when executed by a processor, causes the processor to perform the method of the present invention.

It will be appreciated that the present invention can enable a user to share a portion of a protected content, without making the entire content available to the recipient.

Each feature disclosed in the description and (where appropriate) the claims and drawings may be provided independently or in any appropriate combination. Reference numerals appearing in the claims are by way of illustration only and shall have no limiting effect on the scope of the claims.

The invention claimed is:

1. A method for providing an excerpt of a protected digital content to a receiver, the method comprising, at a device:
receiving the protected digital content and a global license for the protected digital content, the global license comprising a master control word, wherein the protected digital content is divided into a plurality of parts, each part being encrypted using a control word specific for the part, each control word being generated from the master control word, wherein the protected digital content is associated with authorization information that limits excerpt provision;
selecting the parts of the protected digital content to be included in the excerpt;
generating the control words for the selected parts from the master control word;
verifying the authorization information;
generating an excerpt license for the selected parts only if verification indicates that excerpt provision is allowed, the excerpt license comprising the control words for the selected parts; and
transmitting the selected parts of the protected digital content and the excerpt license to the receiver.

2. The method of claim 1, wherein each generated control word is associated with an index of the part corresponding to the control word and wherein each index is included in the excerpt license.

3. The method of claim 2, wherein the control words are generated using a pseudo-random number generator taking as input the master control word and the indices.

4. A computer program product storing instructions on a non-transitory computer readable medium, which, when executed by a processor, causes the processor to perform the method of claim 1.

5. A device for providing an excerpt of a protected digital content to a receiver, the device comprising at least one hardware processor configured to:
receive the protected digital content and a global license for the protected digital content, the global license comprising a master control word, wherein the protected digital content is divided into a plurality of parts, each part being encrypted using a control word specific for the part, each control word being generated from the master control word, wherein the protected digital content is associated with authorization information that limits excerpt provision;
select the parts of the protected digital content to be included in the excerpt;
generate the control words for the selected parts from the master control word;
verify the authorization information;
generate an excerpt license for the selected parts only if verification indicates that excerpt provision is allowed, the excerpt license comprising the control words for the selected parts; and
transmit the selected parts of the protected digital content and the excerpt license to the receiver.

6. The device of claim 5, wherein the processor is further configured to associate each generated control word with an index of the part corresponding to the control word and to include each index in the excerpt license during the generation of the excerpt license.

7. The device of claim 6, wherein the device further comprises a pseudo-random number generator adapted to take the master control word and the indices as input to generate the control words.

8. A user device configured to receive excerpts of protected digital content, the user device comprising at least one hardware processor configured to:
receive the protected digital content and a global license for the protected digital content, the global license comprising the master control word, wherein the protected digital content is divided into a plurality of parts, each part being encrypted using a control word specific for the part, each control word being generated from the master control word, wherein the protected digital content is associated with authorization information that limits excerpt provision;
generate one or more control words for one or more selected parts of the protected digital content from the master control word;
verify the authorization information;
generate an excerpt license for the selected parts only if verification indicates that excerpt provision is allowed, the excerpt license comprising the one or more control words for the selected parts; and descramble the one or more selected parts using the one or more control words for the selected parts.

9. The user device of claim 8, wherein the processor is further configured to associate each generated control word with an index of the part corresponding to the control word and to include each index in the excerpt license during the generation of the excerpt license.

10. The user device of claim 9, further comprising a pseudo-random number generator configured to take the master control word and the indices as input to generate the control words.

\* \* \* \* \*